Feb. 17, 1942.　　　　H. H. HAND　　　　2,273,754
ROTARY INTERNAL COMBUSTION ENGINE
Filed March 10, 1941　　　5 Sheets-Sheet 1
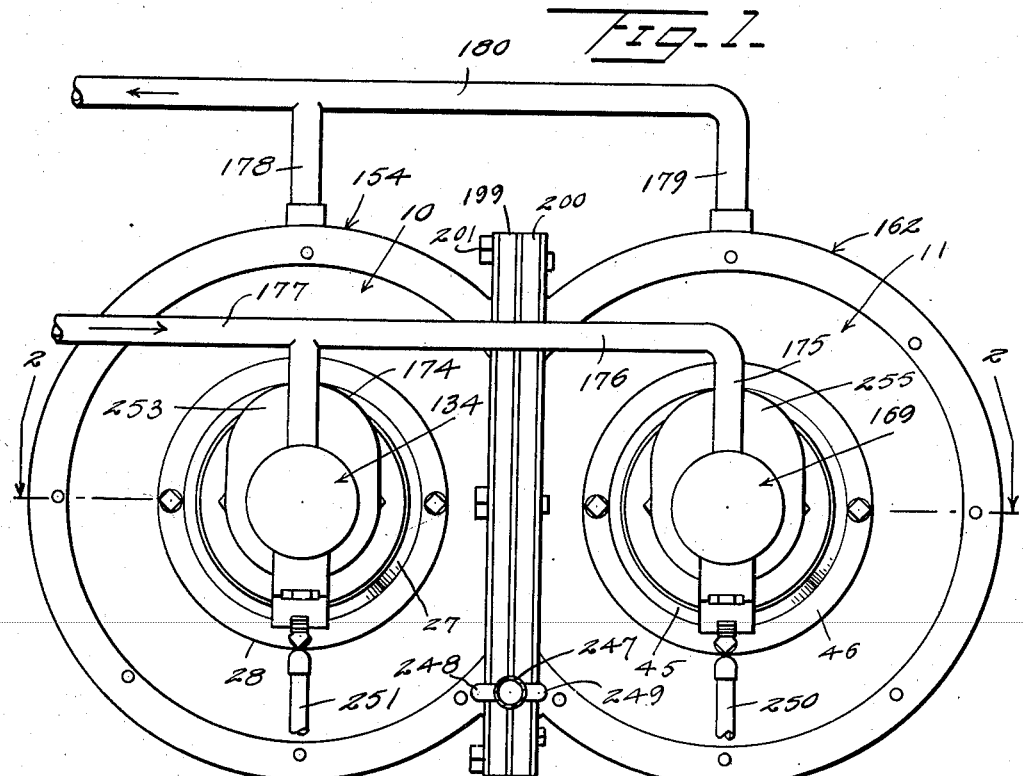
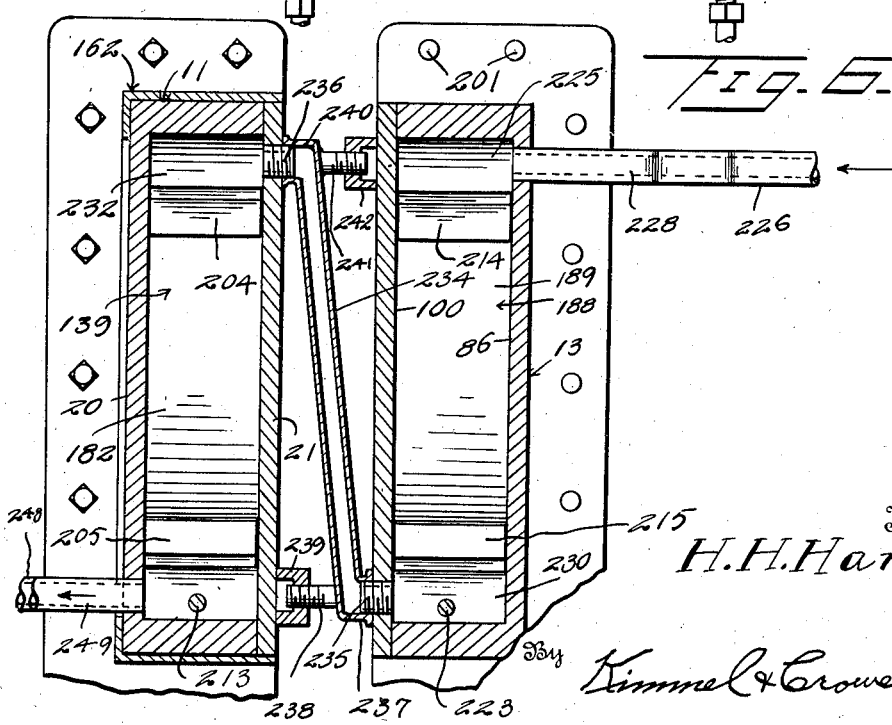
Inventor
H. H. Hand
By Kimmel & Crowell
Attorneys

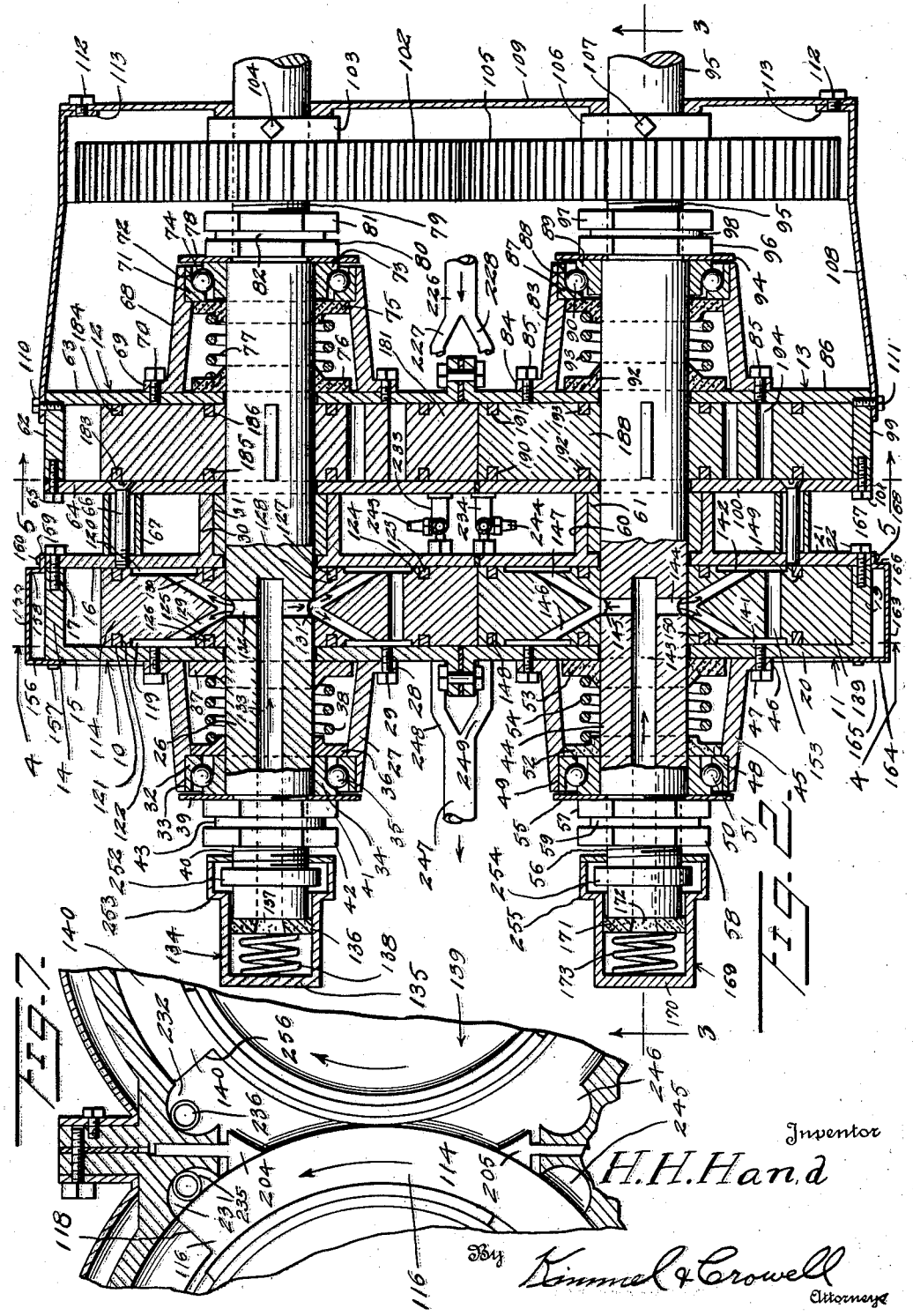

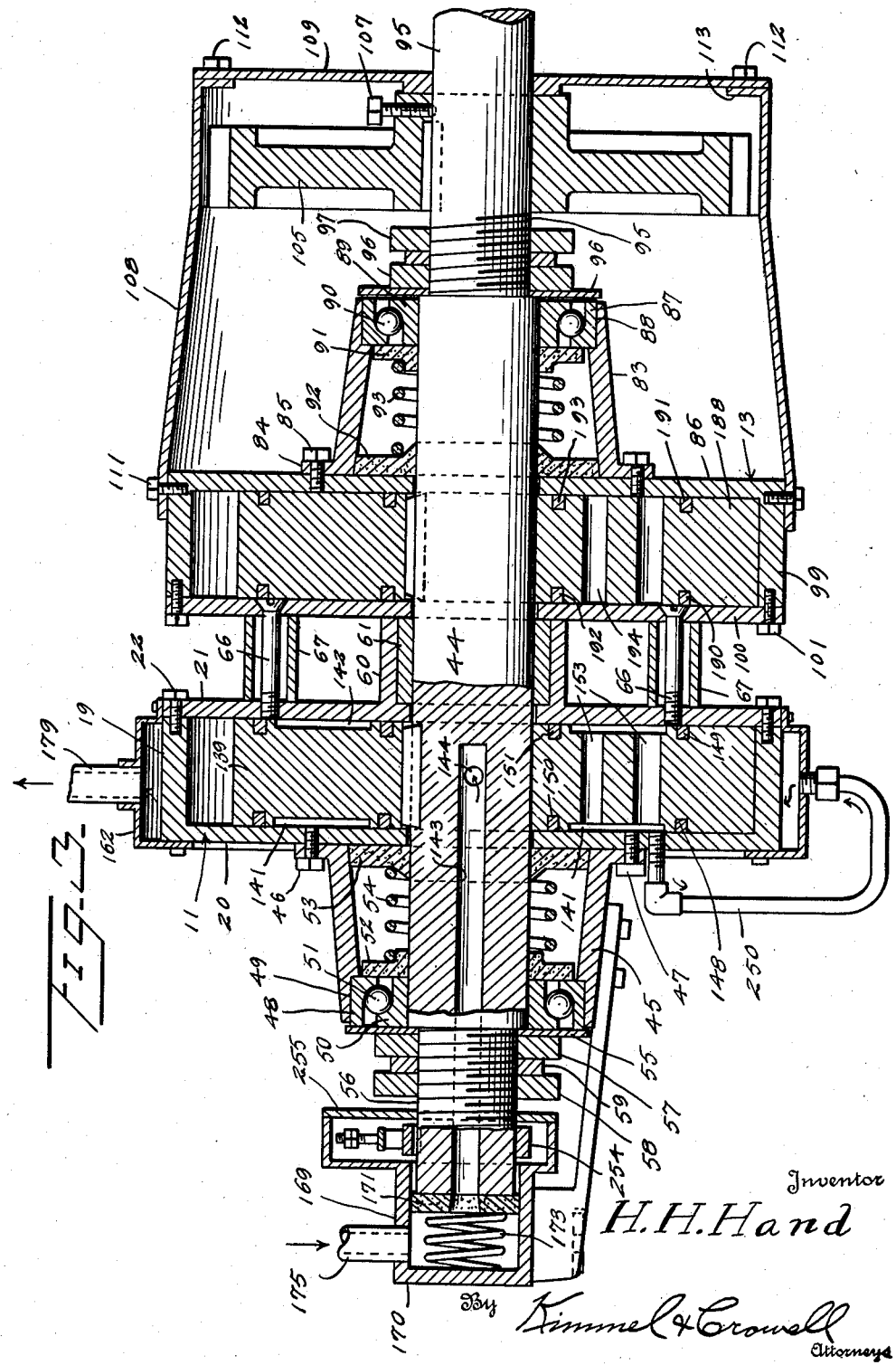

Feb. 17, 1942.  H. H. HAND  2,273,754
ROTARY INTERNAL COMBUSTION ENGINE
Filed March 10, 1941   5 Sheets-Sheet 4
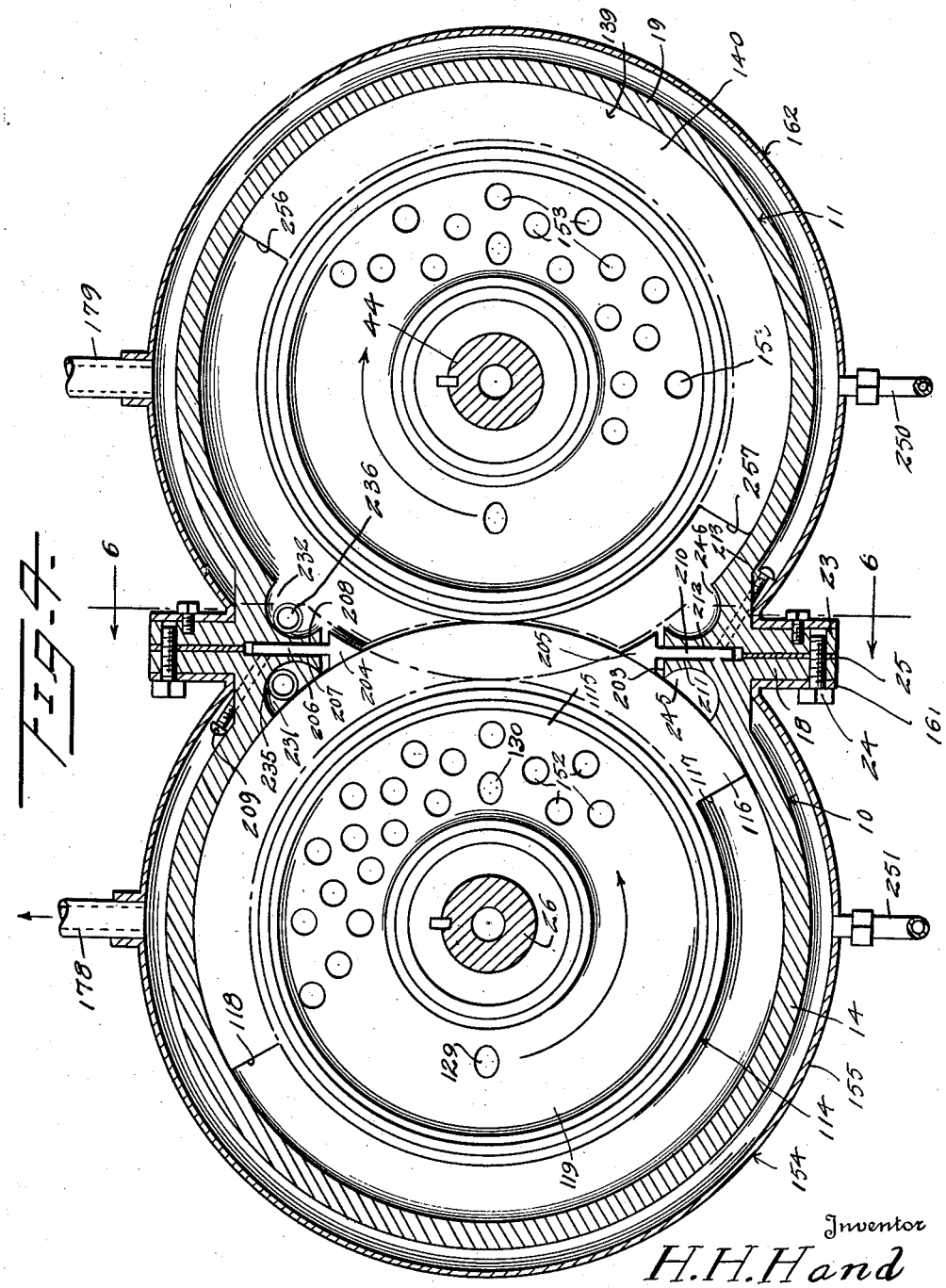
Inventor
H. H. Hand
By Kimmel & Crowell
Attorneys

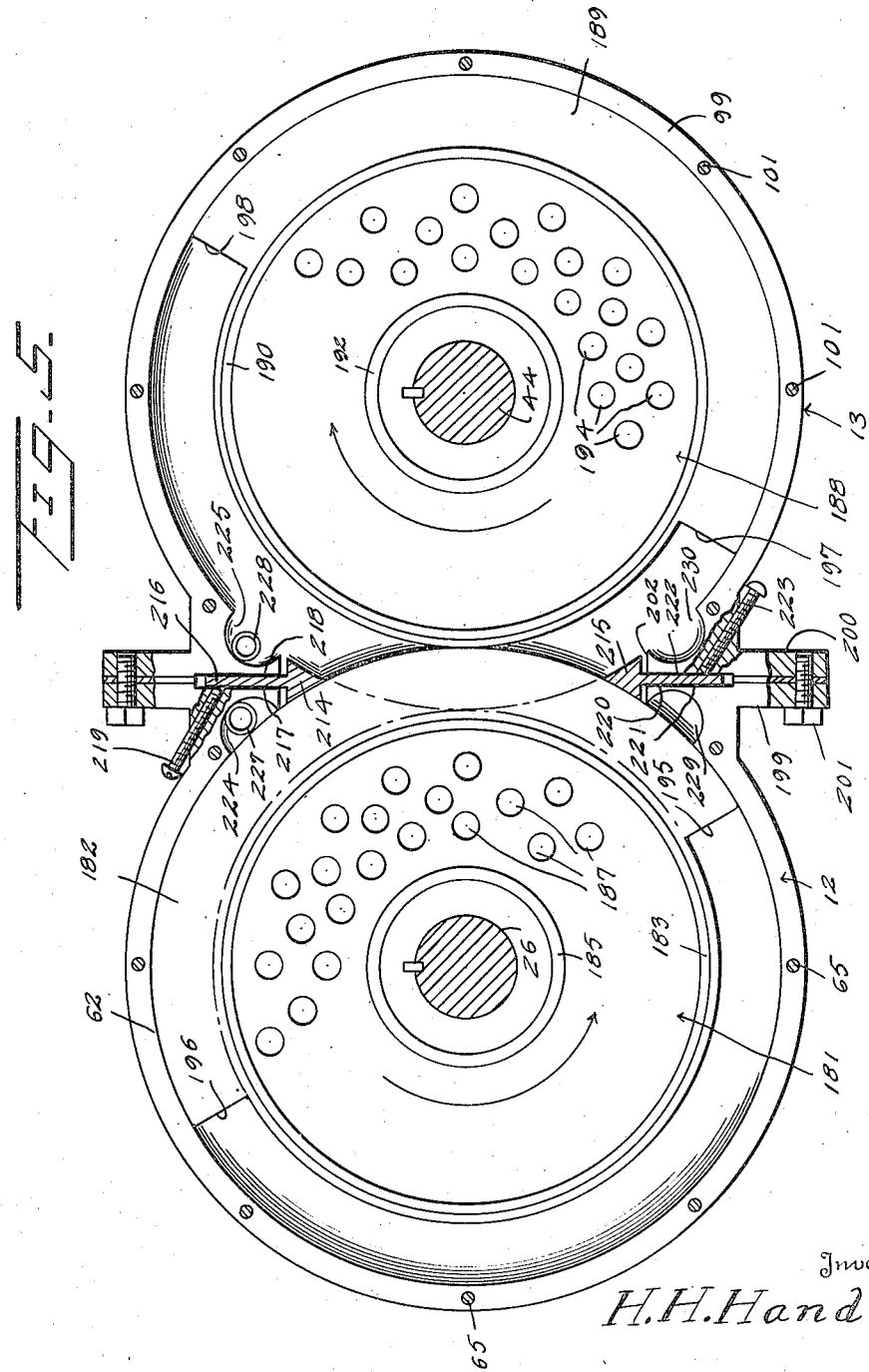

Patented Feb. 17, 1942

2,273,754

UNITED STATES PATENT OFFICE 2,273,754

ROTARY INTERNAL COMBUSTION ENGINE

Howard H. Hand, Corpus Christi, Tex.

Application March 10, 1941, Serial No. 382,657

10 Claims. (Cl. 123—12)

This invention relates to internal combustion engines and more particularly to a rotary internal combustion engine.

An object of this invention is to provide a rotary engine of this type including a pair of rotary power members and a pair of rotary compressor members for compressing the fuel mixture externally of the power members.

Another object of this invention is to provide a rotary engine of this type which is exceedingly simple in construction and wherein the rotors of both the compressors and power members also constitute rotary valves for regulating the intake and exhaust of the fuel mixture and also the exhaust of the burned fuel mixture.

A further object of this invention is to provide in a rotary engine of this type an improved means for cooling the engine.

A still further object of this invention is to provide in an engine of this type a power unit composed of a pair of complementary rotors wherein the peripheral surface of a portion of one rotor constitutes an abutment for the other rotor when the other rotor is on its power stroke.

A further object of this invention is to provide in an engine of this type, an improved adjustable sealing means between the complementary rotors for providing desired peripheral contact with the rotors to thereby prevent any pressure losses.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 1 is a detail front elevation of a rotary internal combustion engine constructed according to an embodiment of this invention, Figure 2 is a sectional view taken on the line 2—2 of Figure 1, Figure 3 is a sectional view taken on the line 3—3 of Figure 2, Figure 4 is a sectional view taken on the line 4—4 of Figure 2, Figure 5 is a sectional view taken on the line 5—5 of Figure 2, Figure 6 is a fragmentary sectional view taken on the line 6—6 of Figure 4, and Figure 7 is a fragmentary sectional view similar to Figure 4 but showing the rotors in a firing position with respect to one of the rotors.

Referring to the drawings, the numerals 10 and 11 designate generally a pair of sidewise abutting and communicating power cylinders and the numerals 12 and 13 generally a pair of compression cylinders which are adapted to be positioned in spaced relation to and connected with the power cylinders 10 and 11.

The cylinder 10 comprises a substantially cylindrical side wall 14 provided with an integral front wall 15 and a removable rear wall or head 16. The rear wall or head 16 is secured by fastening devices 17 to the side wall 14. The cylinder 10 is formed with a flange 18 on its inner side by means of which the cylinder 10 may be detachably secured to the cylinder 11. The cylinder 11 comprises a cylindrical outer wall 19, a front wall or head 20 and a rear wall or head 21. The rear wall or head 21 is detachable, being secured to the cylindrical wall 19 by means of fastening devices 22. The cylinder 11 on its inner portion is provided with a flange 23 which confronts the flange 18 and is secured to the flange 18 by fastening devices 24. A gasket or sealing element 25 is interposed between the confronting flanges 18 and 23.

A shaft 26 is rotatably disposed through the cylinder or housing 10 and also through the cylinder or housing 12. The wall or head 15 has secured to the outer surface thereof a tapered bushing 27 having a flange 28, which is secured by fastening devices 29 to the outer face of the head or wall 15. The head or inner wall 16 is provided with a cylindrical bushing 30 having a bearing liner 31 disposed therein, which engages about the shaft 26 between the two housings or cylinders 10 and 12. The rear end of the bushing 30 abuts against the adjacent side of the housing or cylinder 12, as shown in Figure 2.

The shaft 26 is preferably supported from the bushing 27 by means of an anti-friction bearing including an outer race 32, which is disposed in a seat 33 formed in the outer end of the bushing 27. An inner race 34 is disposed about the shaft 26 and balls 35 are disposed between the two races 32 and 34 and provide not only a means for rotatably supporting the shaft 26 from the bushing 27, but also provide a thrust bearing for taking up the endwise thrust of the shaft 26. A washer 36 is disposed about the shaft 26 and bears against the inner side of the anti-friction bearing including the race members 32 and 34 and the balls 35. A second washer 37 is disposed about the shaft 26 and bears against the adjacent face of the head or wall 15. An expanding spring 38 is interposed between the two washers 36 and 37, the washers 36 and 37 being sealing washers to prevent any liquid or fluid from leaking out from the cylinder 10.

A plate 39 or washer is disposed about a reduced outer portion 40 of the shaft 26 and bears against the inner race member 34. A nut 41 is threaded onto the reduced shaft portion 40 and engages against the washer or plate 39. A second nut 42 constituting a lock nut is threaded onto the shaft member 40, and preferably a lock washer 43 is interposed between the two nuts 41 and 42.

A second shaft 44 is rotatably disposed through the two cylinders or housing members 11 and 13 and the second shaft 44 is preferably supported for rotation relative to the two cylinders or housing members 11 and 13 by means of a tapered bushing 45 provided with an inner flange 46 which is secured by fastening devices 47 to the outer wall or head 20 of the cylinder 11. An outer race member 48 is mounted in a seat 49 formed in the outer end of the bushing 45 and an inner race member 50 is disposed about the shaft 44. A plurality of anti-friction balls 51 are interposed between the two race members 48 and 50, and the anti-friction bearing formed by the race members 48 and 50 and the balls 51 constitute not only a means for rotatably supporting the shaft 44 from the bushing 45, but also provide a means for taking up endwise thrust on the shaft 44. A sealing washer 52 is disposed about the shaft 44 within the bushing 45 and a second sealing washer 53 is also disposed about the shaft 44 in the bushing 45. An expanding spring 54 is interposed between the two washers 52 and 53 and constantly holds these washers against the anti-friction bearing and the outer wall or head 20 respectively.

A relatively thin washer or plate 55 is mounted on a reduced stub shaft 56 formed with the shaft 44 and the washer 55 bears against the inner race member 50. A holding nut 57 is threaded onto the stub shaft 56 and a second or lock nut 58 is also threaded onto the stub shaft 56. A lock washer 59 is interposed between the two nuts 57 and 58.

The inner wall or head 21 has formed integral therewith a cylindrical bushing 60, which extends in the direction of the housing 13 and an inner liner or bearing member 61 is mounted within the bushing 60. The shaft 40 is journalled in the liner or bearing 61. The two bushings 30 and 60 constitute a spacing means for spacing the cylinders 10 and 11 from the cylinders 12 and 13 respectively.

The compression cylinder 12 comprises a cylindrical outer wall 62, a rear head or wall 63 and a forward wall or head 64. The forward wall or head 64 is detachably secured to the cylindrical side wall 62 by fastening devices 65. The housing or cylinder 12 is detachably secured in spaced relation with respect to the cylinder 10 by means of a plurality of bolts or fastening members 66, which extend through the wall 64 and are threaded into the wall or head 16. A cylindrical spacing element 67 is disposed about the bolt or fastening member 66. The rear wall or head 63 has secured thereto a rearwardly tapered bushing 68, which is provided with a forward flange 69 secured by fastening devices 70 to the rear head or wall 63. An outer anti-friction race member 71 is mounted in a seat 72 formed in the rear end portion of the bushing 68. An inner race member 73 is mounted about the shaft 26 and anti-friction balls 74 are interposed between the two race members 71 and 73. An outer sealing washer 75 is disposed about the shaft 26 and bears against the two race members 71 and 73. An inner sealing washer 76 is disposed about the shaft 26 and bears against the head or wall 63. An expanding spring 77 is interposed between the two sealing washers 75 and 76 and constantly holds these washers in position against the race members 71 and 73 and against the rear head 63 respectively.

A plate or washer 78 is disposed about a reduced stub shaft 79 and is held tightly against the inner race member 73 by means of a nut 80. A second or lock nut 81 is threaded on the stub shaft 79 and a lock washer 82 is interposed between the two nuts 80 and 81. A second rear bushing 83 provided with a flange 84 is secured by fastening devices 85 to the rear head 86 of the cylinder or housing 13. An outer anti-friction race member 87 is disposed in a seat 88 formed in the rear end portion of the bushing 83, and an inner race member 89 is disposed about the shaft 44. A plurality of anti-friction balls or bearing members 90 are interposed between the two race members 87 and 89. A rear sealing washer 91 is disposed about the shaft 44 within the bushing 83, and a forward sealing washer 92 is also disposed about the shaft 44 and bears against the rear head 86 of the cylinder or housing 13. An expanding spring 93 is interposed between the two sealing washers 91 and 92 and constantly holds these sealing washers in a sealing position with the washer 92 bearing against the head 86 and the washer 91 bearing against the race members 87 and 89.

A holding washer or plate 94 is disposed about a reduced shaft portion 95 extending from and integral with the shaft 44. A nut 96 is threaded on the reduced shaft 95 and a second or lock nut 97 is also threaded on the reduced shaft 95. A lock washer 98 is interposed between the two nuts 96 and 97.

The cylinder or housing 13 includes the rear head 86, a cylindrical side wall 99 and a detachable forward head 100. The head 100 is detachably held on the cylindrical side wall 99 by means of fastening members 101.

A spur gear 102 is keyed on the shaft 26 rearwardly of the lock nut 81, the gear 102 being provided with a hub 103 and a set screw 104 is threaded through the hub 103 and engages the shaft 26, so as to hold the gear 102 against endwise movement. A second spur gear 105 is keyed on the reduced shaft 95 rearwardly of the lock nut 97 and is provided with a hub 106 through which a set screw 107 is threaded. The set screw 107 maintains the gear 105 against endwise movement. The two gears 102 and 105 are in constant mesh with each other and are of substantially the same diameter so that the two shafts 26 and 44 will rotate at an equal speed.

A rearwardly tapered housing 108 having a rear wall 109 is disposed about the gears 102 and 105 and also about the bushings 68 and 83. The forward portion of the housing 108 is secured by fastening devices 110 and 111 to the rear cylinder members 12 and 13 respectively. The rear wall or plate 109 is preferably removable, being secured by fastening devices 112 to an inwardly projecting flange 113 carried by the housing member 108. The shafts 26 and 44 extend through the rear wall 109, as shown in Figure 2.

A rotor 114 is disposed in the housing 10 and is keyed or otherwise fixedly secured to the shaft 26. The rotor 114 includes a substantially annular body 115, which is provided with a substantially semi-circular enlargement or abutment 116. The peripheral surface of the abutment 116 substantially contacts with the inner surface of the cylindrical wall 19 and the opposite ends 117 and 118 of the abutment 116 are radial with respect to the axis of the rotor 114. The opposite faces of the rotor 114 are provided with annular recesses 119 and 120 forming a pair of annular cooling chambers within which a cooling liquid, such as water or the like, is adapted to engage.

An outer annular sealing ring 121 is mounted in an annular groove 122 formed in one face of the rotor 114, and a second outer annular sealing ring 123 is mounted in an outer annular recess or groove 124 formed in the opposite face of the rotor 114. An inner annular sealing ring 125 is mounted in an inner annular groove 126 disposed inwardly from the annular water chamber 119 and a second annular sealing ring 127 is mounted in an annular groove 128 formed in the opposite face of the rotor 114 inwardly from the annular water chamber 120.

The rotor 114 is formed with two pairs of oppositely disposed outwardly inclined water passages or ducts. The passages of each pair are indicated at 129, 130. The passages of each pair merge into each other at their inner ends and also communicate at such point with an annular peripheral groove 131 formed in the shaft. The outer ends of the passages 129 open into the water chamber 119. The outer ends of the passages 130 open into the water chamber 120. A plurality of radially disposed passages 132 are formed in the shaft 26, and at their outer ends communicate with the groove 131 and at their inner ends communicate with an axial passage 133. The passage 133 opens through one end of the shaft 26 and communicates with a cylindrical housing 134, which is disposed about the adjacent end of the shaft 26. The housing 134 is formed with an outer end wall 135, and in order to provide a means whereby the water in the housing 134 may be prevented from leaking about the shaft 26 and between the housing 134 I have provided an annular sealing gasket 136 formed with an axial opening 137 which communicates with the axial bore or passage 133. An expanding spring 138 is disposed in the housing 134, one end of the spring 138 bearing against the outer wall or head 135 and the other or inner end of the spring 138 bearing against the washer 136.

The housing 11 has rotatably mounted therein a rotor or piston 139 which is similar in every detail to the rotor or piston 114 and includes an outer enlarged semi-cylindrical abutment 140. The piston or rotor 139 is keyed or otherwise fixedly secured to the shaft 44 and is provided in the opposite faces thereof with a pair of water chambers 141 and 142. The shaft 44 is formed with an axial bore or fluid passage 143 and a plurality of radially disposed passages 144 which at their inner ends open into the bore 143. The outer ends of the passages 144 communicate with an annular groove 145 formed in the outer periphery of the shaft 44. The rotor 139 is provided with two pairs of oppositely disposed outwardly inclined water passages or ducts, and the passages of each of said pairs are indicated at 146, 147. The passages of each of said pairs merge into each other at their inner ends and also at such point communicate with the groove 145. The outer ends of the passages 146 open into the chamber 141 and the outer ends of the passages 147 open into the chamber 142. The opposite faces of the rotor 139 have mounted therein outer sealing rings 148 and 149 and the opposite faces of the rotor 139 also have mounted therein inner sealing rings 150 and 151.

The rotor 114 is provided with a plurality of transversely extending openings 152 which communicate with the water chambers 119 and 120 and provide a means whereby the water may flow from one water chamber to the other, and also provide a means for balancing the rotor 114. The rotor 139 is also provided with a plurality of transversely extending openings 153, which communicate the two passages 141 and 142 with each other and which also provide a means whereby the rotor 139 may be properly balanced. A substantially annular water jacket, generally designated as 154, is disposed about the cylinder 10 and includes an outer wall 155, and a forward side wall or flange 156 secured as by fastening devices 157 to the head 15. The cylindrical outer wall 155 is provided with a reduced flange 158 opposite from the flange 156 and the flange 158 is provided with an annular flange 159, which engages the peripheral surface of the cylindrical wall 14. The flange 159 is secured as by fastening devices 160 to the outer side of the cylindrical wall 14. The inner portion of the jacket 15 is provided with a flange 161 which bears against the flange 18 and through which the fastening devices 24 engage.

A water jacket member, generally designated as 162, engages about the cylinder 11 and includes an outer cylindrical wall 163, a flange or forward wall 164 which is secured by fastening devices 165 to the head 15, and also includes a reduced flange 166 formed with a laterally extending flange 167. The flange 167 is secured by fastening devices 168 to the outer periphery of the cylinder wall 19. A cap or water housing 169 engages about the forward end of the shaft 44 and is provided with a head or end wall 170. A washer or sealing gasket 171 engages against the forward end of the shaft 44 and is provided with a central opening 172 communicating with the axial passage 143. A spring 173 constantly holds the gasket or sealing member 171 against the forward end of the shaft 44 and prevents any water or other fluid from leaking out between the shaft 44 and the housing 169. The water housing 133 has an intake pipe 174 connected therewith and the housing 169 has an intake pipe 175 connected thereto.

A connecting pipe 176 connects the two pipes 174 and 175 together and the connecting pipe 176 may be extended, as at 177, to a suitable source of water supply, such as a radiator or the like. The water jacket 154 has an outlet pipe 178 connected therewith and the water jacket 162 has an outlet pipe 179 connected therewith. A return pipe line 180 connects the two pipes 178 and 179 together and also connects these pipes with the radiator or a suitable water carry-off means.

The compression cylinder 12 has rotatably mounted therein a rotor, generally designated as 181, which is keyed or otherwise fixed to the shaft 10. The rotor 181 is provided with a substantially semi-cylindrical abutment 182 which, at its periphery, contacts with the inner surface of the cylindrical wall 62. The rotor 181 has mounted in the opposite faces thereof a pair of outer sealing rings 183 and 184 and also has mounted in the outer faces thereof an inner pair of sealing rings 185 and 186. The rotor 181 between the sealing rings is provided with a plurality of spaced apart openings 187, which provide a means for balancing the rotor 181. The cylinder 13 has rotatably mounted therein a compression rotor, generally designated as 188, which is keyed or otherwise fixedly secured to the shaft 44. The rotor 188 is formed with a substantially semi-cylindrical rotary abutment 189, and the opposite faces of the rotor 188 have mounted therein a pair of outer sealing rings 190 and 191. The opposite faces of the rotor 188 also have mounted therein an inner pair of sealing rings 192 and 193.

The sealing rings 190, 191, 192 and 193 frictionally engage against the inner faces of the head members 186 and 100, as shown in Figure 2. The rotor 188 is also provided with a plurality of openings or recesses 194 which form a means for balancing the rotor 188. The openings 194 are disposed between the inner and outer rings thereof. As shown in Figure 5 the opopsite ends of the abutment 182 are radial as at 195 and 196 and in like manner the opopsite ends of the abutment 189 are on a radius to the rotor 188, as at 197 and 198. The two rotors 181 and 188 are oppositely disposed so that the periphery of the abutment 182 will substantially contact with the periphery of the rotor 188, and alternately the periphery of the abutment 189 will contact with the periphery of the rotor 181 on the reduced part of the rotor 181 between the abutment ends 195 and 196.

The two cylinders or housings 12 and 13 are each provided with abutting flanges 199 and 200 respectively, which are secured together by fastening devices 201. The two cylinders or housing members 12 and 13 communicate with each other through a communicating passage 202 and the respective abutments of the rotors 181 and 188 project into the passage 202.

The two cylinders 10 and 11 also communicate with each other through a communicating passage 203 into which the respective abutments 116 and 140 are adapted to alternately extend. In order to provide a means whereby the rotor 114 may be sealed with respect to the cylinder 11, I have provided a pair of wedge-shaped sealing members 204 and 205 which are disposed in opposed relation on opposite sides of the passage 203. The sealing member 204 on one side thereof is adapted to contact with the periphery of the abutment 116 and on the opposite side thereof is adapted to contact with the periphery of the abutment 140. The sealing member 205 is adapted on one side thereof to contact with the periphery of the abutment 116 and on the opposite side thereof to contact with the periphery of the abutment 140. The sealing member 204 is provided with a plate 206 which is adjustable in a pair of confronting passages 207 and 208, which are formed in the adjacent faces of the two cylinders 14 and 19 respectively.

A wedge adjusting screw 209 is threaded through the cylinder wall 14 and engages against the plate 206 so as to hold this plate in adjusted position for contact with the peripheries of the abutment members 116 and 140. The sealing member 205 is provided with a plate 210 which is adjustable in confronting passages 211 and 212 formed in the adjacent or abutting faces of the cylinders 14 and 19 opposite from the passages 207 and 208. A wedge adjusting screw 213 is threaded through the wall of the cylinder member 19 and engages against the plate 210, so as to thereby hold the wedge or sealing member 205 in the desired sealing position for contact with the peripheries of the abutments members 116 and 140.

A wedge-shaped sealing member 214 is disposed in a position between the two rotors 181 and 188, and a second wedge-shaped sealing member 215 is also disposed in a position between the two rotors 181 and 188 and is positioned in opposed relation to the sealing member 214. The sealing member 214 is provided with a plate 216, which is slidable in confronting recesses or guide passages 217 and 218 which are formed in the cylinders 62 and 99 respectively, and a sealing member adjusting screw 219 is threaded through the cylinder wall 62 and engages against the plate 216. The sealing member 215 is provided with a plate 220, which is slidable in a pair of confronting recesses or guide passages 221 and 222 formed in the confronting portions of the cylinder walls 62 and 69 and the sealing member 215 is held in adjusted position by means of an adjusting screw 223 which is threaded through the cylinder wall 99 and bears against the plate 220.

The cylinder 62 is provided with an intake passage 224 adjacent the wedge member 214 and the cylinder 99 is also provided with an intake passage 225 disposed opposite from the intake passage 24 and adjacent the wedge member 214. An intake pipe 226, which is adapted to be connected to a carburetor or other fuel mixing means, is provided with a pair of forwardly divergent branches 227 and 228 which communicate with the intake passages 224 and 225 respectively.

The cylinder 12 is also provided with an exhaust port 229 adjacent the wedge or sealing member 215 and the cylinder 13 is provided with an exhaust port 230 opposite from the exhaust port 229 and adjacent the wedge 215. The cylinder 10 is provided with an intake port 231 adjacent the wedge or sealing member 204, and the cylinder 11 is provided with an intake port 232 opposite from the intake port 231 and also adjacent the wedge or sealing member 204. The exhaust port 229 of the compressor cylinder 12 is connected with the intake port 231 by means of a connecting pipe 233 and the exhaust port 230 of the compressor cylinder 13 is connected with the intake port 232 by means of a tubular connector 234. The tubular connectors 233 and 234 are of like construction and in Figure 6 there is disclosed one of these tubular connectors in detail. As shown in Figure 6, the inner wall or head 100 is provided with a short nipple 235 and a short nipple 236 is threaded into the inner wall or head 21 of the cylinder 11.

The tubular connector 234 extends upwardly from the exhaust port 230 and is provided at its lower end with an angularly disposed cap or connector 237, which telescopes the extended end portion of the nipple 235. A threaded stud 238 is welded or otherwise fixed to the lower end of the tubular member 234 and is disposed in substantially axial alignment with the nipple 235. A nut or pressure member 239 is threaded onto the stud 238 and is adapted to bear against the rear side of the wall or head 21 so that the connector 237 may be tightly engaged with the nipple 235. The upper end of the tubular member 234 is provided with an obtusely disposed connector 240 which is adapted to telescope the extended portion of the nipple 236, and a threaded stud 241 is welded or otherwise fixed to the upper end of the tubular member 234 in axial alignment with the axis of the nipple 236.

A nut 242 is threaded onto the stud 241 and is adapted to bear against the forward wall or head 100 of the cylinder 13, so that adjustment of the nut 242 will hold the connector 240 in the desired coupling position with respect to the nipple 236. It will be understood that the tubular member 233 is provided with a similar clamping or attaching means to that shown with respect to the tubular member 234.

The tubular member 233 comprises a firing or combustion chamber and a spark plug 243 is connected with the tubular member 233 intermediate the ends thereof, as shown in Figure 2. The tubular connecting member 234 also constitutes a firing chamber and has a spark plug 244 connected therewith. The two spark plugs 243 and 244 are adapted to be connected to a suitable circuit making or breaking means, as will be hereinafter described, so as to provide for the desired explosion of the compressed gases mounted in the firing chambers 233 and 234.

The cylinder 10 in the lower portion thereof is provided with an exhaust port 245 adjacent the wedge or sealing member 205, and the cylinder 11 is also provided with an exhaust port 246 adjacent the wedge member 205 and opposite from the exhaust port 245. A common exhaust pipe 247 provided with branches 248 and 249, which are connected with the exhaust ports 245 and 246 respectively, is adapted to carry off the burned gases from the cylinders 10 and 11.

As shown in Figure 3, the forward water or cooling chamber 141 of the cylinder 11 is connected with the water jacket 162 by means of a connecting pipe 250. The water chamber 119 is also connected by means of a pipe 251, similar to the pipe 250, with the water jacket 154.

The shaft 26 at its forward end has mounted thereon a distributor mechanism 252, which is enclosed by a distributor housing or cap 253. The distributor mechanism 252 is adapted to be connected with the spark plug 243. The shaft 44 has mounted thereon a distributor mechanism 254, which is enclosed by a distributor housing 255 and the distributor mechanism 254 is adapted to be connected with the spark plug 244. The distributors 252 and 254 are of conventional construction.

In the operation of this internal combustion engine the fuel mixture is drawn into the intake ports 224 and 225 of the compressors 11 and 12 respectively upon rotation of the rotors 181 and 188 in the direction shown by the arrows in Figure 5. In the positions of the rotors shown in Figure 5, the rotor 188 is on the upper portion thereof on its intake stroke and at the lower portion thereof on the exhaust stroke. In other words, the rotation of the cam lobe or abutment 189 past the intake port 225 with the reduced portion of the rotor 188 disposed between the intake and exhaust ports 225 and 230 respectively will open both of these ports, but direct communication between these two ports is prevented by contact of the peripheral surface of the rotary abutment or lobe 182 which contacts with the reduced peripheral surface of the rotor 188 and will provide for the suction of the fuel mixture from the intake port 29 as the trailing wall or end 198 of the abutment 189 rotates in a clockwise direction.

The leading end 197 of the abutment member 189 will forcibly move the fuel mixture into the exhaust port 230. It will be understood that when the leading end 197 of the abutment 189 passes the intake port 225, this port will be cut off and the fuel mixture will be contained in the space formed by the reduction of the rotor 188 between the leading end 197 and the trailing end 198. This fuel mixture will be carried around in the cylinder 13 unitl the trailing end 198 passes the exhaust port 230 at which time the exhaust port 230 will be opened, and when the trailing end 198 passes the intake port 225 this port will also be opened and further rotation of the trailing end 198 for substantially a half revolution will draw the unburned fuel mixture into the cylinder 13.

As shown in Figure 5, the unburned fuel mixture is contained in the space between the leading end 196 of the abutment member or lobe 182 and the trailing end 195, this mixture being carried around in the cylinder 12. The exhaust port 229 of the cylinder 12 is at this time closed, but will be opened as soon as the trailing end 195 passes the exhaust port at which time the fuel mixture will be forced into the combined compression tube and firing chamber 233. When the exhaust port 230 is opened from the cylinder 13 the fuel mixture will be compressed in the combined compression tube and firing member 234.

The rotation of the power rotor members 114 and 139 is so timed with respect to the rotation of the compressor rotor members 181 and 188 that the trailing end 256 of the abutment member 140 will be just passing the intake port 232 at the time that the leading end 197 of the abutment member 189 is in substantially an exhaust port closing position with respect to the exhaust port 230. At this time the distributor mechanism 254 is active to close an electric circuit to the spark plug 244 so as to explode the compressed gasses against the trailing end 256. At this time also the abutment member 116 is in a port closing position closing the intake and exhaust ports 231 and 235 of the cylinder 10, and the periphery of the abutment member 116 is in substantial contact with the periphery of the reduced portion of the rotor 139 so that the compressed gases entering the cylinder 11 from the intake portion 232 will not be able to pass out of the exhaust port 246. The leading end 257 of the abutment member 140 is in a position whereby the previously burned fuel mixture is substantially exhausted from the cylinder 11 through the exhaust port 246.

The rotor 114 in the position shown in Figure 4 is in a substantially idling position with respect to the delivery of power as the fuel mixture has been exploded between the leading end 118 and the trailing end 117 of the abutment member 116. The trailing end 117 is very close to an exhaust port opening portion with respect to the exhaust port 245, and when the trailing end 117 passes the exhaust port 245 the exhaust gases will begin to be forced out through the port 245. It will be understood with respect to the rotor 114 that this rotor will operate in the same manner as the rotor 139, that is when the abutment member 140 is in a port closing position for closing the two ports 246 and 232, the abutment member 116 will be in a port opening position.

In this manner the rotary abutments or lobes of the compressor members 181 and 189 constitute valve members for alternately opening and closing the intake and exhaust ports of the cylinders 12 and 13 and compressing the fuel mixture in the compressing chambers 233 and 234. In like manner the abutment members or lobes 116 and 139 constitute valve members for alternately opening and closing the intake ports of the cylinders 10 and 11 and also constitute rotary power pistons for delivering power to the shafts 26 and 44.

A rotary internal combustion engine constructed according to an embodiment of this invention will be exceedingly simple in construction and smooth in operation due to the balancing of the several rotors, and as the rotors constitute movable abutments in addition to constituting rotary valves for opening and closing the several ports, it is not necessary to provide any valve structure or valve operating means for the intake and exhaust of the fuel mixture and the burned fuel respectively.

While the engine structure hereinbefore described has been constructed particularly for use as an internal combustion engine of the rotary type, this same structure may be readily used as a vacuum pump or as a pump for air or other fluid and may also be used as a fluid drive or coupling. Where the device is used as a pump the intake pipe connection 226 may be connected with the fluid, which is to be pumped and the outlet or exhaust pipe connection 247 may be connected to the desired pressure source or receptacle. Where the device is used as a pump the spark plugs and the distributors may be eliminated. Where the device is used as a pump one of the shafts 95 or 97 may be connected to a suitable power device.

What I claim is:

1. A rotary internal combustion engine comprising a stationary housing having a pair of sidewise abutting and communicating cylinders, a pair of shafts journalled one in each cylinder, a rotor fixed to each shaft, each rotor including a substantially semi-cylindrical reduced diameter part and a substantially semi-cylindrical enlarged diameter part constituting a rotary abutment, the reduced part of one rotor substantially contacting with the enlarged part of the other rotor, inner and outer sealing rings carried by each of said rotors on the opposite faces thereof, each rotor having an annular cooling chamber in the opposite faces thereof and connecting passages between said chambers, each shaft having an axial fluid passage therein and radial passages communicating with a peripheral groove and each rotor also having fluid passages communicating said cooling chambers with said groove, a water jacket about each cylinder, means connecting said jacket with one of said cooling chambers, means discharging water into said axial passages, said housing having a pair of intake ports adjacent the abutting portions of said cylinders and also having a pair of exhaust ports spaced from said intake ports, a pair of opposed wedge-shaped sealing members, and means for adjusting said sealing members whereby the opposite sides thereof will substantially contact with the peripheral surfaces of said enlarged rotor parts.

2. In a rotary internal combustion engine, a pair of stationary inner sidewise aligned cylinders, said cylinders having the upper portions of their inner sides disposed in abutting relation and formed with confronting passages, said cylinders having the lower portions of their inner sides disposed in abutting relation and formed with confronting passages, the said several abutting portions each formed with an outwardly directed flange, said cylinders communicating one with the other between said upper and lower abutting portions, a pair of shafts each being journalled in a cylinder, a rotor fixed on each shaft and provided with a reduced part and an enlarged part, the reduced part of one rotor contacting with the enlarged part of the other rotor, means for securing the upper portions of the inner sides of said cylinders in abutting relation, means for securing the lower portions of the inner sides of said cylinders in abutting relation, each cylinder being provided with an impelling medium intake in proximity to the upper inner side portion thereof, each cylinder being formed with an outlet in proximity to the lower inner side portion thereof, upper and lower oppositely extending sealing members common to and substantially contacting with said rotors, one of said members including a plate adjustably mounted in the passages of the upper side portions of said cylinders and terminating into a wedge-shaped part depending from such portions, the other one of said members including a plate adjustably mounted in the passages of the lower inner side portions of said cylinders and terminating in a wedge-shaped part extending upwardly from such portions, inwardly inclined means carried by the upper side portion of a cylinder for retaining one of said members in position, and inwardly inclined means carried by the lower inner side portion of a cylinder for retaining the other one of said members in position.

3. In a rotary internal combustion engine, a pair of stationary inner sidewise aligned cylinders, said cylinders having the upper portions of their inner sides disposed in abutting relation, said cylinders having the lower portions of their inner sides disposed in abutting relation, the said several abutting portions each formed with an outwardly directed flange, said cylinders communicating one with the other between said upper and lower abutting portions, a pair of shafts each being journalled in a cylinder, a rotor fixed on each shaft and provided with a reduced part and an enlarged part, the reduced part of one rotor contacting with the enlarged part of the other rotor, means for securing the upper portions of the inner sides of said cylinders in abutting relation, means for securing the lower portions of the inner sides of said cylinders in abutting relation, each cylinder being provided with an impelling medium intake in proximity to the upper inner side portion thereof, each cylinder being formed with an outlet in proximity to the lower inner side portion thereof, upper and lower oppositely extending wedge-shaped sealing members common to and substantially contacting with said rotors, one of said members being adjustably mounted between the upper side portions of said cylinders and depending from such portion, the other one of said members being adjustably mounted between the lower inner side portions of said cylinders and extending upwardly from such portions, means carried by the upper side portion of a cylinder for retaining one of said members in position, each of said rotors being formed in its front and rear faces with a peripheral annular chamber in proximity to its axis for receiving a cooling medium, each of said shafts having an axial bore for communication with a sealing medium supply, each of said rotors including two oppositely disposed pairs of oppositely extending outwardly inclined conducting ducts, the ducts of each pair at their outer ends opening into said chambers and at their inner ends communicating with each other, said shafts provided with means for establishing communication between the inner ends of said ducts and said bore, and means carried by the lower side portion of a cylinder for retaining the other one of said members in position.

4. In a rotary internal combustion engine, a pair of stationary inner sidewise aligned power cylinders, a pair of inner sidewise aligned compression cylinders, each power cylinder being disposed in axial alignment with a compression cylinder, a cylinder of each pair having the upper and lower portions of their inner sides disposed in abutitng relation, one cylinder of each pair communicating with the other cylinder of the pair between the upper and lower inner side portions of the cylinders of a pair, a pair of geared together shafts each journalled in a power cylinder and the compression cylinder axially aligned therewith, means for securing a power cylinder to a compression cylinder, means for maintaining the upper and lower portions of the inner sides of a pair of cylinders in abutting relation, each of said cylinders provided with an intake in proximity to the upper inner side portion thereof and an outlet in proximity to the lower inner side portion thereof, a pair of power rotors fixed to said shafts within the power cylinders, a pair of compression rotors fixed to said shaft within said compression cylinders, each of said rotors of a pair including a reduced part and an enlarged part, the reduced part of one rotor of a pair substantially contacting with the enlarged part of the other rotor of a pair, an upstanding tube between the outlet of a compression cylinder and the intake of a power cylinder constituting a firing chamber, upper and lower oppositely disposed sealing members between the inner sides of a pair of cylinders, one of the members of each pair being adjustably mounted between the upper inner side portions of a pair of cylinders, depending therefrom, common to and substantially contacting with a pair of rotors, the other member of each pair being adjustably mounted between the lower inner side portions of the cylinders of a pair, extending upwardly therefrom, common to and substantially contacting with the rotors of a pair, means carried by the upper inner side portion of a cylinder of a pair for maintaining an upper sealing member in position, and means carried by the lower inner side portion of a cylinder of a pair for retaining a lower sealing member in position.

5. In a rotary internal combustion engine, a pair of stationary inner sidewise aligned power cylinders, a pair of inner sidewise aligned compression cylinders, each power cylinder being disposed in axial alignment with a compression cylinder, a cylinder of each pair having the upper and lower portions of their inner sides disposed in abutting relation, one cylinder of each pair communicating with the other cylinder of the pair between the upper and lower inner side portions of the cylinders of a pair, a pair of geared together shafts each journalled in a power cylinder and the compression cylinder axially aligned therewith, means for securing a power cylinder to a compression cylinder, means for maintaining the upper and lower portions of the inner sides of a pair of cylinders in abutting relation, each of said cylinders provided with an intake in proximity to the upper inner side portion thereof and an outlet in proximity to the lower inner side portion thereof, a pair of power rotors fixed to said shafts within the power cylinders, a pair of compression rotors fixed to said shaft within said compression cylinders, each of said rotors of a pair including a reduced part and an enlarged part, the reduced part of one rotor of a pair substantially contacting with the enlarged part of the other rotor of a pair, an upstanding connecting tube between the outlet of a compression cylinder and the intake of a power cylinder constituting a firing chamber, upper and lower oppositely disposed sealing members between the inner sides of a pair of cylinders, one of the members of each pair being adjustably mounted between the upper inner side portions of a pair of cylinders, depending therefrom, common to and substantially contacting with a pair of rotors, the other member of each pair being adjustably mounted between the lower inner side portions of the cylinder of a pair extending upwardly therefrom, common to and substantially contacting with the rotors of a pair, means carried by an upper inner side portion of a pair for maintaing the upper sealing member in position, means carried by the lower inner side portion of a cylinder of a pair for retaining the lower sealing member in position, and a spark plug arranged in each of said connecting tubes intermediate of the ends of the latter.

6. In a rotary internal combustion engine, a pair of stationary inner sidewise aligned power cylinders, a pair of inner sidewise aligned compression cylinders, each power cylinder being disposed in axial alignment with a compression cylinder, a cylinder of each pair having the upper and lower portions of their inner sides disposed in abutting relation, one cylinder of each pair commuicating with the other cylinder of the pair between the upper and lower inner side portions of the cylinders of a pair, a pair of geared shafts each journalled in a power cylinder and the compression cylinder axially aligned therewith, means for securing a power cylinder to a compression cylinder, means for maintaining the upper and lower portions of the inner sides of a pair of cylinders in abutting relation, each of said cylinders provided with an intake in proximity to the upper side portion and an outlet in proximity to the lower inner side portion thereof, a pair of power rotors fixed to said shafts within the power cylinders, a pair of compression rotors fixed to said shafts within said compression cylinders, each of said rotors of a pair including a reduced part and an enlarged part, the reduced part of one rotor of a pair substantially contacting with the enlarged part of the other rotor of a pair, a connecting tube between the outlet of a compression cylinder and the intake of a power cylinder, upper and lower oppositely disposed sealing members arranged at the inner sides of a pair of cylinders, one of the members of each pair being adjustably mounted between the upper inner side portions of a pair of cylinders, depending therefrom, common to and substantially contacting with a pair of rotors, the other member of each pair being adjustably mounted between the lower inner side portions of the cylinder of a pair, extending upwardly therefrom, common to and substantially contacting with the rotors of a pair, means carried by an upper inner side portion of a pair for maintaining an upper sealing member in position, means carried by a lower inner side portion of a pair for retaining a lower sealing member in position, said power rotors being provided with annular chambers in their front and rear faces for receiving a cooling medium, each of said shafts formed with water passages leading from a cooling medium supply, said power rotors formed with oppositely disposed ducts opening at their outer ends into said chambers, and said shafts provided with means for establishing communication between the inner ends of said ducts and said passage.

7. In a rotary internal combustion engine, a pair of stationary power cylinders disposed in inner sidewise abutting relation and opening into each other from their inner sides, each of said cylinders having an intake and an outlet disposed respectively in proximity to the upper and lower ends of its inner side, a pair of stationary compression cylinders arranged in inner sidewise abutting relation and opening into each other from their inner sides, each of said compression cylinders having an intake and an outlet respectively disposed in proximity to the upper and lower ends of its inner side, each of said compression cylinders arranged rearwardly of, spaced from and having its axis aligned with the axis of a power cylinder, a pair of geared together shafts each journaled in a power and a compression cylinder, a pair of power rotors fixed to said shafts and disposed in said power cylinders, a pair of compression rotors fixed to said shafts and arranged in said compression cylinders, the rotors of each pair having oppositely disposed portions for overlapping at the inner sides of their correlated cylinders, a pair of upstanding connecting tubes each arranged between a power and a compression cylinder and leading from the outlet of the latter to the intake of the former, each of said tubes constituting a combustion chamber, a spark plug connected to each tube, intermediate the ends of the latter, and means for securing the cylinders of a pair together in abutting relation.

8. In a rotary internal combustion engine, a pair of stationary power cylinders disposed in inner sidewise abutting relation and opening into each other from their inner sides, each of said cylinders having an intake and an outlet disposed respectively in proximity to the upper and lower ends of its inner side, a pair of stationary compression cylinders arranged in inner sidewise abutting relation and opening into each other from their inner sides, each of said compression cylinders having an intake and an outlet respectively disposed in proximity to the upper and lower ends of its inner side, each of said compression cylinders arranged rearwardly of, spaced from and having its axis aligned with the axis of a power cylinder, a pair of geared together shafts each journaled in a power and a compression cylinder, a pair of power rotors fixed to said shafts and disposed in said power cylinders, a pair of compression rotors fixed to said shafts and arranged in said compression cylinders, the rotors of each pair having oppositely disposed portions for overlapping at the inner sides of their correlated cylinders, a pair of upstanding connecting tubes each arranged between a power and a compression cylinder and leading from the outlet of the latter to the intake of the former, each of said tubes constituting a combustion chamber, a spark plug connected to each tube, means for securing the cylinders of a pair together in abutting relation, said tubes inclining forwardly from the outlets of the compression cylinders to the intakes of the power cylinders, and means for binding the lower ends of said tubes against the compression cylinders and their upper ends against said power cylinders.

9. In a rotary internal combustion engine, a pair of stationary inner sidewise abutting power cylinders opening into each other from their inner side, each of said cylinders provided with an intake for an impelling medium of the combusted type and with an outlet, a pair of geared together shafts each journaled in a cylinder and provided with a closed inner end axial bore for leading from a cooling medium supply, an annular peripheral groove and ducts leading from said groove to the bore, a pair of power rotors each fixed to a shaft and mounted in a cylinder, each of said rotors being formed with an annular cooling medium receiver in its front and rear face, two oppositely disposed pairs of oppositely outwardly inclined passages opening at their outer ends into said chambers, merging at their inner ends into each other and communicating at such inner ends with said groove, a pair of sealing rings in each of the faces of each rotor and having a chamber arranged between and spaced therefrom, and said rotors having oppositely disposed reduced and enlarged portions extending into said cylinders from the inner sides thereof and for overlapping each other at such inner sides.

10. In a rotary internal combustion engine, a pair of stationary inner sidewise abutting power cylinders opening into each other from their inner side, each of said cylinders provided with an intake for an impelling medium of the combusted type and with an outlet, a pair of geared together shafts each journaled in a cylinder and provided with a closed inner end axial bore for leading from a cooling medium supply, an annular peripheral groove and ducts leading from said groove to the bore, a pair of power rotors each fixed to a shaft and mounted in a cylinder, each of said rotors being formed with an annular cooling medium receiver in its front and rear face, two oppositely disposed pairs of oppositely outwardly inclined passages opening at their outer ends into said chambers, merging at their inner ends into each other and communicating at such inner ends with said groove, a pair of sealing rings in each of the faces of each rotor and having a chamber arranged between and spaced therefrom, said rotors having oppositely disposed reduced and enlarged portions extending into said cylinders from the inner sides thereof and for overlapping each other at such inner sides, and each of said rotors being formed with spaced means for establishing communication between said chambers to provide for the circulation of the cooling medium therethrough.

HOWARD H. HAND.